United States Patent [19]

McPhee et al.

[11] 4,015,918
[45] Apr. 5, 1977

[54] HOSE MOLDING DEVICE

[75] Inventors: Donald J. McPhee, Littleton; Mark A. Newberry, Lakewood, both of Colo.

[73] Assignee: The Gates Rubber Company, Denver, Colo.

[22] Filed: June 25, 1975

[21] Appl. No.: 590,367

[52] U.S. Cl. .................. 425/403; 425/392
[51] Int. Cl.² ............................ B29C 17/00
[58] Field of Search ......... 425/383, 384, 392, 393, 425/403; 264/294, 295, DIG. 52; 285/423, 238, DIG. 22; 138/96 R, 96 T; 156/143, 144

[56] References Cited

UNITED STATES PATENTS

| | | | |
|---|---|---|---|
| 1,797,193 | 3/1931 | Kimmich | 264/DIG. 52 |
| 2,632,479 | 3/1953 | Pfeil et al. | 138/96 T |
| 2,998,985 | 9/1961 | Burns et al. | 264/295 |
| 3,067,083 | 12/1962 | Reahard | 156/144 |
| 3,809,522 | 5/1974 | Kramer | 425/392 |
| 3,859,408 | 1/1975 | Voss et al. | 425/392 |
| 3,888,523 | 6/1975 | Bartholomew | 285/423 |

FOREIGN PATENTS OR APPLICATIONS

| | | | |
|---|---|---|---|
| 716,197 | 10/1966 | Italy | 425/393 |
| 464,623 | 12/1968 | Switzerland | 285/DIG. 22 |
| 860,906 | 2/1961 | United Kingdom | 285/238 |

Primary Examiner—J. Howard Flint, Jr.
Attorney, Agent, or Firm—H. W. Oberg, Jr.; Raymond Fink; Curtis H. Castleman, Jr.

[57] ABSTRACT

A curved hose molding device which includes a curved mandrel with a fixed collar near one end and a removable elastomeric collar near the opposite end, the collars defining means for molding the ends of a hose carcass a desirable length apart.

15 Claims, 4 Drawing Figures

HOSE MOLDING DEVICE

BACKGROUND OF THE INVENTION

The invention relates to pipes and tubular conduits, but more particularly, the invention relates to a mandrel and process for making curved hose of specified length with molded ends.

Curved hose is typically manufactured by positioning a pre-cut length of hose carcass over a curved mandrel and then heating and curing the carcass to define a curved hose. The mandrel may have a collar at one end against which the hose carcass is positioned and molded. The open end of the mandrel is usually rounded or "bullet-nose" shape to ease mandrel insertion. The curved hose ends are commonly referred to as "the collar end" and "the bullet-nose end." During cure, the hose carcass may shrink, elongate, or stay substantially the same depending on its construction. These factors must be taken into consideration when establishing the lengths of hose carcass.

A finished hose must have a length that falls within specified tolerances. The irregularity of carcass shrinking and stretching makes it virtually impossible to predict the length of hose carcass necessary to yield a cured hose within acceptable tolerances. Because of this unpredictability, prior art methods involve cutting the hose carcass sufficiently long to yield an over length cured hose, and then trimming the excessive length from bullet-nose end of the cured hose to yield a finished hose of specified length. Additional time and materials are required to trim the hose.

SUMMARY OF THE INVENTION

In accordance with the invention, a curved hose mandrel, a removable elastomeric collar, and a process for making curved hose are provided. The curved mandrel has a collar fixed to one end portion and a means near its bullet-nose end, such as a circumferential groove, for retaining the selectively removable elastomeric collar.

The collar has a sleeve portion that fits over the mandrel and an attaching means, such as an internal bead, that cooperates with the retaining means of the mandrel. Optionally, one end of the sleeve may have a flange that provides an increased radial surface for molding the end of a hose carcass.

The process is practiced by placing a length of carcass onto the mandrel so that one end is pressed against the collar. The elastomeric collar is stretched over the mandrel to a point where the attaching means of the sleeve engages the retaining means of the mandrel. Normally, this slightly compresses the hose carcass. Heat is applied which cures the carcass to define a finished hose with molded ends and acceptable length.

The invention yields several advantages including:
No waste of the hose carcass to allow for post trimming;
No labor for post trimming;
Hose with molded and generally "squared" ends; and
Controlled hose length within acceptable manufacturing tolerances.

These and other advantages of the invention may be realized after reviewing the specification and drawings in which.

DESCRIPTION OF PREFERRED EMBODIMENT

Figure 1:
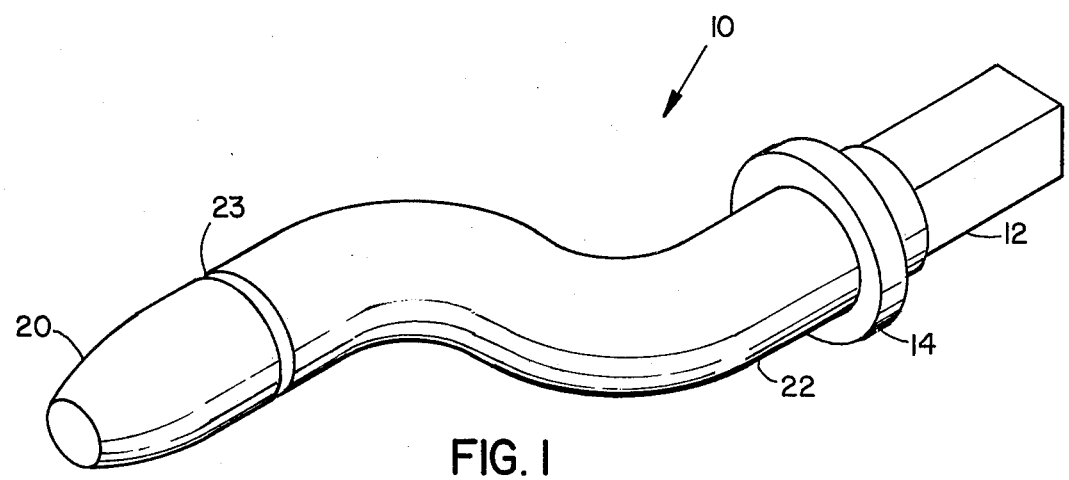
FIG. 1 is an isometric view of a mandrel of the invention.
Figure 3:
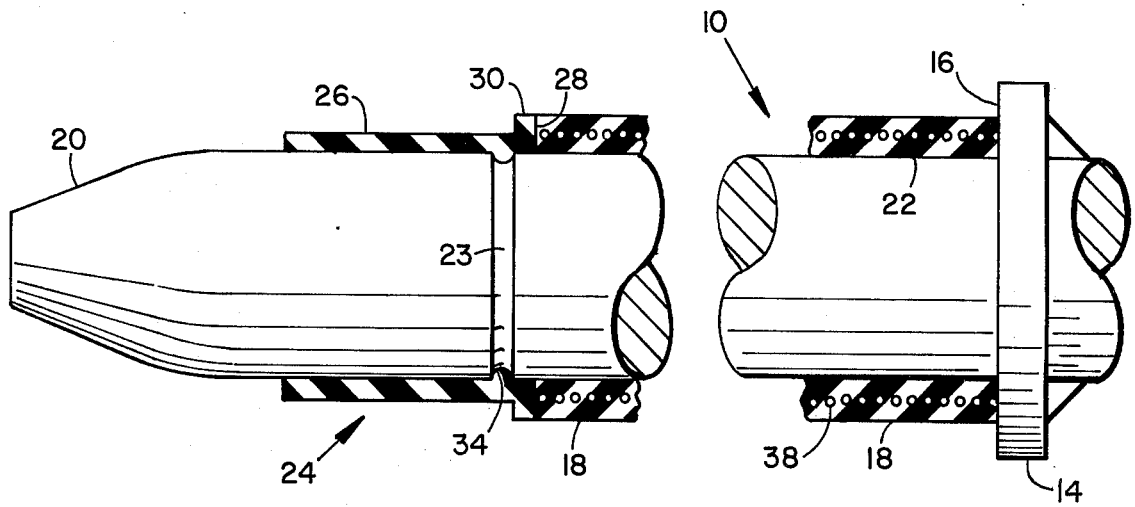
FIG. 3 is a shortened transposed cutaway view showing the interrelationship between the collar and mandrel of the invention.
Figure 2:
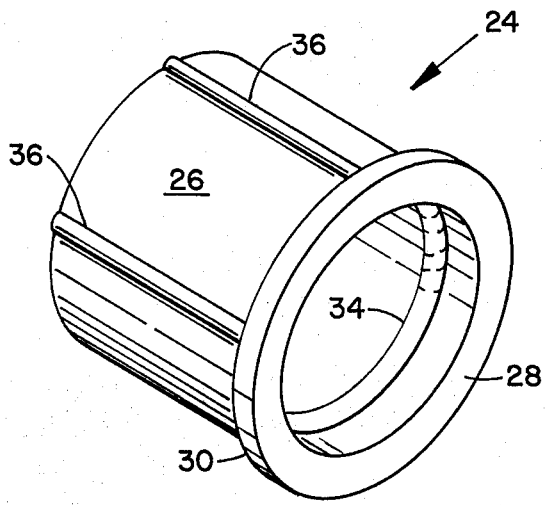
FIG. 2 is an isometric view of an elastomeric collar of the invention.

Referring generally to the drawings, a curved cylindraceous mandrel 10 for shaping a hose carcass is provided. The mandrel has means 12 at one end for supporting the mandrel during use. For example, the mandrel may include a squared end or other fastening device. A collar 14 is provided near the mandrel mounting means. The collar defines a radial mold surface 16 that engages a hose carcass 18.

The free end of the mandrel is preferably rounded to allow easy insertion of the mandrel into the hose carcass. Oftentimes, the free end of the mandrel is referred to as the bullet-nose end 20 while the obstructed end of the mandrel is known as the collar end 22. Means are provided near the bullet-nose end for retaining a removable elastomeric collar 24 in a predetermined position relative to the mandrel. Preferably, the retaining means is a circumferential groove 23 that receives integrally molded portions of the removable collar.

The collar is in the form of an elastomeric sleeve 26 with at least one end portion that defines a molding surface 28. Optionally, the sleeve may have a flange 30 to provide a larger molding surface. Means are integrally molded at the internal diameter of the sleeve for removably attaching the sleeve in position on the mandrel. For example, a radially inward projection in the form of spaced teeth or ridges 32, or preferably, a circumferential bead 34 is provided. Optionally, the exterior surface of the sleeve may have longitudinal ribs 36 which aid in positioning the collar on the mandrel or removing the collar after cure.

The collar 24 is made of an elastomeric material so that it may be stretched as it is positioned on the mandrel. The internal diameter of the collar is less than the external diameter of the cylindraceous mandrel. For example, the collar sleeve 26 may have an internal diameter of 1.44 inches and the mandrel an external diameter of 1.50 inches.

The length of the elastomeric collar 24 is preferably longer than the mean diameter of the collar so that the sleeve portion of the collar will not fold under as it is positioned over the mandrel.

The collar is made of an elastomeric material (preferably Shore A durometer range of 50 to 85) that will sustain high temperatures and repeated use. The mandrel must have physical properties that are substantially unaffected when the hose carcass is subjected to heat for curing. The collar must not appreciably thermally degrade under repeated heat cycles. Silicone rubber is exemplary of a satisfactory elastomeric material which has the required thermal properties. Silicone rubber is stable temperatures up to 450° and very little thermal degradation takes place in the silicone rubber when it is repeatedly heated to 400°. Typical hose carcass of the natural or synthetic rubbers are generally cured in an open steam autoclave at temperatures between 250° and 400° for 10 to 60 minutes.

There may be a predetermined axial distance between the retaining means (bead 34) and the molding surface 28. Preferably, the bead 34 is disposed near the molding surface to insure that a minimum axial portion of the sleeve is subjected to molding forces. Otherwise, the sleeve portion of the collar could possibly deform allowing displacement of the flange.

In use, a hose carcass is cut to predetermined length. The hose carcass is of known construction and may be manufactured using known methods. Usually, the hose carcass is of the natural rubbers, synthetic rubbers, or blends thereof. The carcass typically includes a reinforcement 38 embedded between a tube and cover. Usually, a knitted reinforcement is used because of its ability to be easily deformed over the curves of the mandrel.

The carcass 18 is positioned over the mandrel 10 to a point where one end abuts against the molding surface 16 of the collar 14. As the carcass is inserted over the mandrel, it may be somewhat stretched or shortened because of the "green" nature of the rubber material. Lubricants are often used to aid in positioning the carcass on the mandrel. Once the carcass is positioned in the mandrel, the elastomeric collar 24 is pushed over bullet-nose end 20 radially expanding the sleeve 26. It is helpful to use a twisting motion while inserting the collar to "screw" the collar easily onto the mandrel. The end of the collar with the retaining means (bead 34) must be radially stretched more than the sleeve. When the bead 34 is juxtaposed the groove 23 in the mandrel it automatically snaps into position automatically locating the collar to a predetermined location on the mandrel.

As the sleeve is put into position, it may be necessary for the carcass to be slightly compressed. This is easily done because of the green carcass. The collar is usually positioned at a location on the mandrel that corresponds to the maximum allowable length of the finished hose. Slightly compressing the carcass insures that it will be molded to a determinable length to yield a hose with molded ends. Occasionally, the carcass may shrink away from the ends during the process. Nevertheless, the shrinkage is usually less than the allowable tolerance limits because the maximum allowable length is controlled by the collar.

The mandrel carcass and elastomeric collar are heated to effect curing. Normally, this is done in an open steam autoclave where the temperatures reach 340° for a period of 15 minutes. After the carcass is cured to define a finished hose, the assembly is removed from the autoclave. The hose is pulled from the mandrel which automatically disengages the bead 34. Optionally, the collar may be individually removed with the aid of the ribs 36. An operator need not remove the collar before removing the hose. The cured hose end forces the bead from the groove permitting release. These steps are repeated and the collars re-used.

ADDITIONAL SPECIES

Figure 4:
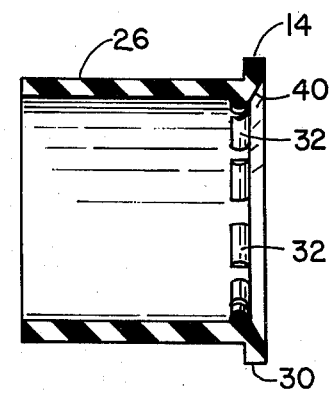
FIG. 4 is an axial view of alternate form of the elastomeric collar of the invention.

Optionally, and as shown in FIG. 4, the flange 14 may have a frustro-conical molding surface 40 to receive the end of a hose carcass. The frustro-conical surface helps hold the carcass into the mandrel preventing the carcass from being pulled away from the mandrel.

The foregoing detailed description is presented for purpose of illustration only and is not intended to limit the scope of the invention which is to be determined from the appended claims.

We claim:

1. A collar for use with a mandrel and for molding an end of a rubber hose comprising:
   a stretchable elastomeric sleeve having at least one circumferential element end that defines a molding surface; and
   means integrally molded at and extending inwardly of the internal diameter of the sleeve for deformably removably attaching the sleeve to the mandrel.

2. The collar delineated in claim 1 wherein the attaching means comprises an integrally molded circumferential bead near the circumferential element end.

3. The collar delineated in claim 2 comprising an integrally molded flange at the circumferential element end.

4. The collar delineated in claim 3 wherein the flange has a generally flat surface which defines the molding surface.

5. The collar delineated in claim 3 wherein the flange has a generally frustro-conical surface which defines the molding surface.

6. The collar delineated in claim 1 comprising means integrally molded at the external diameter of the sleeve for handling the retainer during use.

7. The collar delineated in claim 6 wherein the handling means comprise longitudinally oriented ribs.

8. The collar delineated in claim 7 wherein the length of the sleeve is greater than the diameter of the sleeve.

9. The collar of claim 1 comprised of integrally molded silicone rubber.

10. The retainer of claim 9 wherein the silicone rubber has a shore A durometer of the range of 50 to 85.

11. A mandrel for curved hose comprising:
    a generally cylindraceous member with at least one curved portion between two generally straight first and second end portions;
    a radial collar secured to the cylindraceous member near the first end portion, the collar defining a first hose end molding surface; and
    means disposed near the second end portion below a surface of the cylindraceous member for retaining a removable collar that defines a second hose end molding surface.

12. The mandrel of claim 11 wherein the retaining means is a circumferential groove.

13. The mandrel of claim 12 wherein the axial distance between the radial collar and circumferential groove corresponds to a predetermined hose length.

14. An assembly for curing hose comprising:
    a generally cylindraceous member with at least one curved portion between two generally straight first and second end portions and having a circumferential groove near the second end portion;
    a radial collar secured to the cylindraceous member near the first end portion, the collar defining a first hose end molding surface; and
    a removable collar comprising a stretchable elastomeric sleeve having at least one circumferential element end that defines a second hose end molding surface, and means integrally molded at and extending inwardly of the internal diameter of the sleeve in the form of a molded circumferential bead near the circumferential element end wherein the sleeve has a diameter less than the second end of the cylindraceous member, and the bead is nestable within the circumferential groove, the sleeve stretched over the second end portion and a bead retained in the circumferential groove.

15. A collar comprising:
    an elastomeric sleeve having a circumferential element end that defines a molding surface; and an integrally molded circumferential bead near the circumferential element end.

* * * * *